United States Patent
Chang et al.

(10) Patent No.: US 6,692,791 B2
(45) Date of Patent: Feb. 17, 2004

(54) METHOD FOR MANUFACTURING A CARBON NANOTUBE FIELD EMISSION DISPLAY

(75) Inventors: Yu-Yang Chang, Taipei (TW); Jyh-Rong Sheu, Taipei Hsien (TW); Chun-Tao Lee, Taipei Hsien (TW); Chen-Chung Lee, Taipei Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 122 days.

(21) Appl. No.: 09/978,045

(22) Filed: Oct. 17, 2001

(65) Prior Publication Data

US 2003/0044537 A1 Mar. 6, 2003

(30) Foreign Application Priority Data

Aug. 29, 2001 (TW) ........................................ 90121244 A

(51) Int. Cl.⁷ ................ B05D 5/12; H01J 9/12
(52) U.S. Cl. ............... 427/77; 427/282; 427/307; 427/372.2; 427/402; 430/313; 445/51
(58) Field of Search ............. 427/77, 97, 282, 427/307, 402, 372.2, 379; 216/75, 102; 430/311, 313; 445/51

(56) References Cited

U.S. PATENT DOCUMENTS

| | | | |
|---|---|---|---|
| 6,436,221 B1 * | 8/2002 | Chang et al. | 156/247 |
| 6,440,761 B1 * | 8/2002 | Choi | 438/20 |
| 2001/0004979 A1 * | 6/2001 | Han et al. | 216/4 |
| 2002/0094494 A1 * | 7/2002 | Chung et al. | 430/311 |

\* cited by examiner

Primary Examiner—Brian K. Talbot
(74) Attorney, Agent, or Firm—Birch, Stewart, Kolasch & Birch, LLP

(57) ABSTRACT

The present invention provides a method for manufacturing a carbon nanotube field emission display. The method comprises the steps of providing a substrate, screen printing a first conducting layer on the substrate, sintering the first conducting layer, screen printing an isolation layer on the first conducting layer and a second conducting layer on the isolation layer, etching the second conducting layer and the isolation layer, whereby a cavity exposing the first conducting layer is formed, sintering the second conducting layer and the isolation layer, and forming a carbon nanotube layer on the first conducting layer in the cavity.

7 Claims, 5 Drawing Sheets

METHOD FOR MANUFACTURING A CARBON NANOTUBE FIELD EMISSION DISPLAY

BACKGROUND OF THE INVENTION

1. Field of the Invention

The present invention relates to a method for manufacturing a carbon nanotube field emission display, particularly to a low-cost fabrication method for large area triode structure carbon nanotube field emission displays.

2. Description of the Prior Art

Carbon nanotube field emission displays are matrix displays wherein each pixel comprises a carbon nanotube layer as a cathode for electron emission and transparent electrodes act as anodes attracting the emitted electrons. Light from the pixel image is emitted when the electrons collide with the fluorescent material on the transparent electrodes. This is a diode structure carbon nanotube field emission display.

Triode carbon nanotube field emission displays were developed because diode structure results in high operating voltage. The triode structure additionally has a gate near the carbon nanotube layer. The voltage applied to the gate determines the emission and amount of the electrons. This reduces the operating voltage.

FIGS. 1A–1E are diagrams showing a conventional method for manufacturing a carbon nanotube field emission display.

As shown in FIG. 1A, a glass substrate 11 is provided.

As shown in FIG. 1B, a conducing layer 12 with lines, such as Ag, is screen printed on the glass substrate 11 as a cold cathode.

As shown in FIG. 1C, an isolation layer 13 is coated on the conducting layer 12 by screen printing and cavities 131 are formed by the pattern of the halftone used for the screen printing.

As shown in FIG. 1D, a conducting layer 14 with lines, such as Ag, is further screen printed on the isolation layer 13 as gates. The lines of the conducting layers 12 and 14 are perpendicular. Cavities 141 aligned with the cavities 131 are formed by the pattern of the halftone used for the screen printing. The pattern of the halftone also defines the gates.

Finally, as shown IN FIG. 1E, the conducting layer 12, 14 and the isolation layer 13 are sintered and carbon nanotube layer 15 are formed in the cavities 131 on the conducting layer 12 for electron emission.

In the conventional method described previously, gentle slopes are formed on the edges of the cavities 131 and 141 due to the spreading of the slurry of the conducting and isolation layers 14 and 13. This reduces the area for the carbon nanotube layer 15, increases the distances between the carbon nanotube layer 15 and the conducting layer 14 and causes a high operating voltage. Meanwhile, the gentle slopes of the cavities 141 also may cause short circuits between the layers 12 and 14. These drawbacks are more serious in a large area carbon nanotube field emission display manufactured by the conventional method.

SUMMARY OF THE INVENTION

The present invention provides a low-cost method for manufacturing a large area triode structure carbon nanotube field emission display. The method comprises the steps of providing a substrate, screen printing a first conducting layer on the substrate, sintering the first conducting layer, screen printing an isolation layer on the first conducting layer and a second conducting layer on the isolation layer, etching the second conducting layer and the isolation layer, whereby a cavity exposing the first conducting layer is formed, sintering the second conducting layer and the isolation layer, and forming a carbon nanotube layer on the first conducting layer in the cavity.

The present invention further provides a method for manufacturing a carbon nanotube field emission display. The method comprises the steps of providing a substrate, screen printing a first conducting layer on the substrate, sintering the first conducting layer, forming a carbon nanotube layer on the first conducting layer and a protection layer on the carbon nanotube layer, sintering the carbon nanotube layer and the protection layer, screen printing an isolation layer on the first conducting layer and the protection layer, and a second conducting layer on the isolation layer, etching the second conducting layer and the isolation layer, whereby a cavity exposing protection layer and the first conducting layer is formed, and sintering the second conducting layer and the isolation layer, and removing the protection layer.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

FIGS. 2A–2G are diagrams showing a method for manufacturing a carbon nanotube field emission display according to one embodiment of the invention.

Figure 1A:
FIGS. 1A–1E are diagrams showing a conventional method for manufacturing a carbon nanotube field emission display.
Figure 1B:
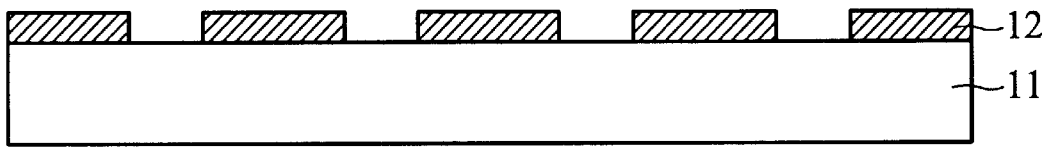
Figure 1C:
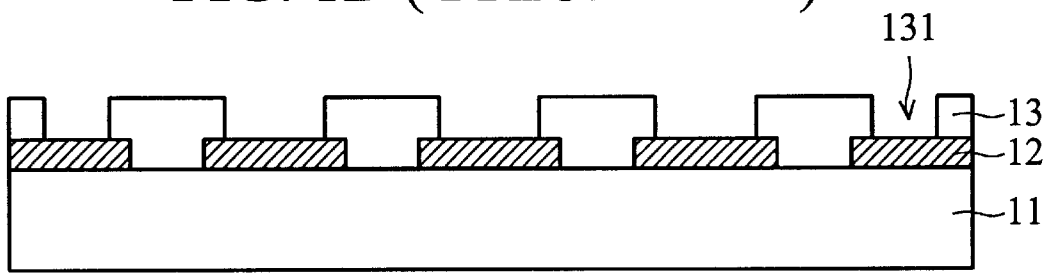
Figure 1D:
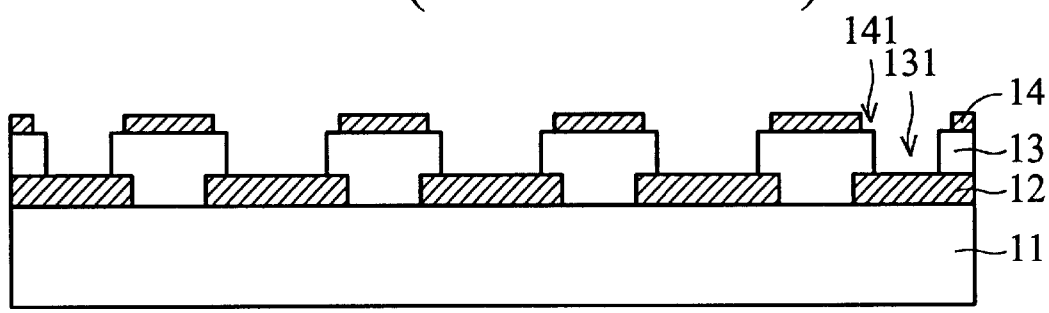
Figure 1E:
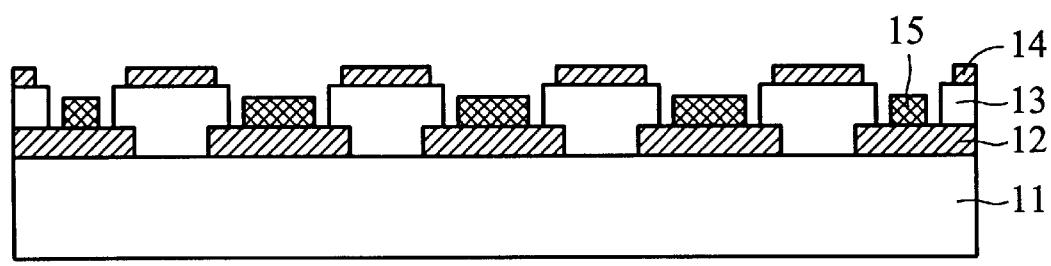
Figure 2A:
FIGS. 2A–2G are diagrams showing a method for manufacturing a carbon nanotube field emission display according to one embodiment of the invention.
Figure 2B:
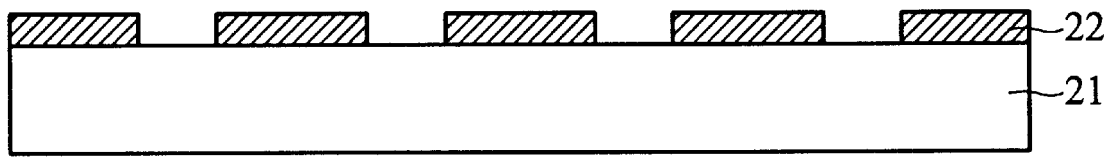

As shown in FIG. 2A, a glass substrate 21 is provided.

As shown in FIG. 22, a conducing layer 22 with lines, such as Ag, is screen printed on the glass substrate 21 as a cold cathode. The conducting layer 22 is then sintered.

Figure 2C:
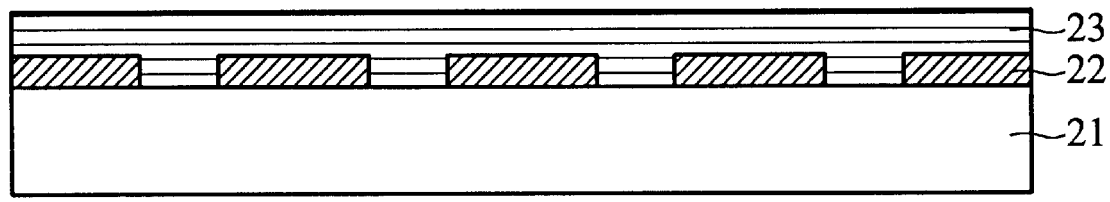

As shown in FIG. 2C, an isolation layer 23 is coated on the conducting layer 22 by screen printing.

Figure 2D:
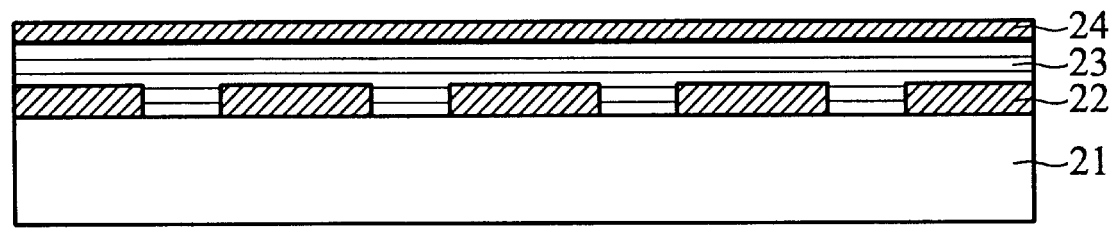

As shown in FIG. 2D, a conducting layer 24 with lines, such as Ag, is further screen printed on the isolation layer 23 as gates. The lines of the conducting layers 22 and 24 are perpendicular. The pattern of the halftone defines the gates.

Figure 2E:
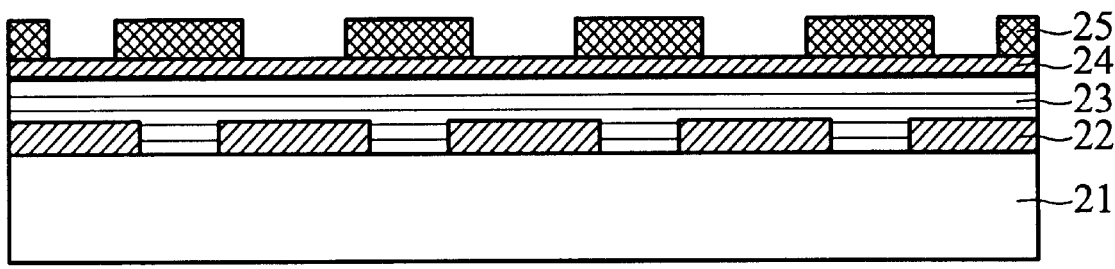
Figure 2F:
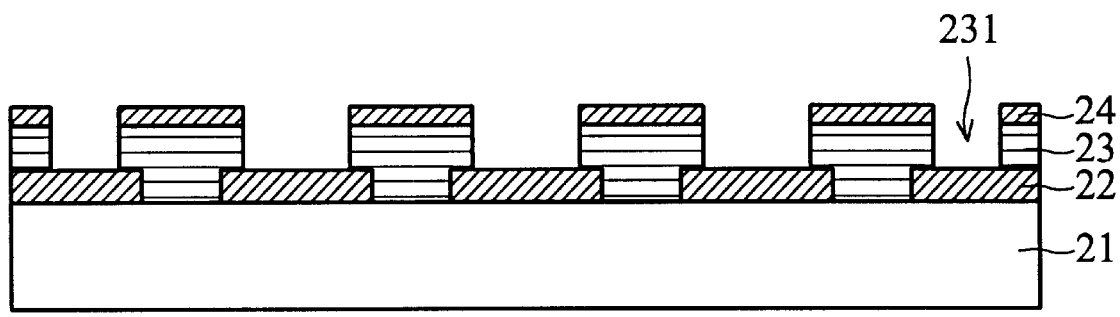

As shown in FIG. 2E, the conducting layer 24 is covered by a patterned masking layer 25. The part of the conducting layer 24 and isolation layer 23 not covered by the masking layer 25 is dry etched by sandblasting. The sintered conducting layer 22 is more resistant to etching by sandblasting than the unsintered conducting layer 24 and the isolation layer 23. The conducting layer 22 is a stop layer for the sandblasting etching. Thus, the pattern on the masking layer 25 forms cavities 231, exposing the conducting layer 22, as shown in FIG. 2F.

Figure 2G:
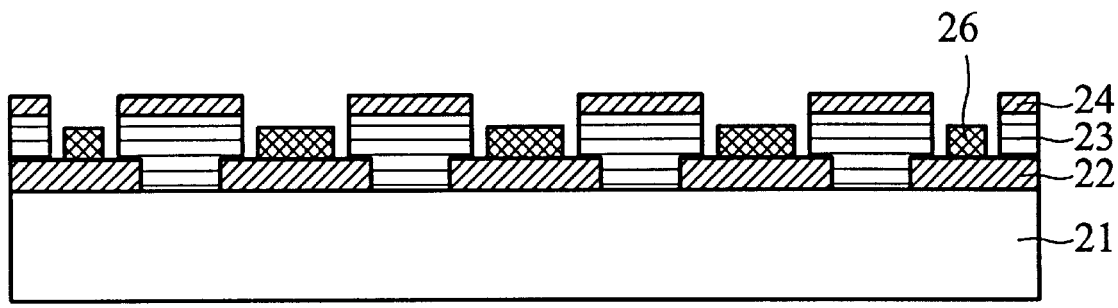

Finally, as shown IN FIG. 2G, the conducting layer 24 and the isolation layer 23 are sintered and carbon nanotube layer 26 are formed in the cavities 231 on the conducting layer 22 for electron emission.

FIGS. 3A–3H are diagrams showing a method for manufacturing a carbon nanotube field emission display according to one embodiment of the invention. The same elements in FIG. 2 and FIG. 3 refer to the same symbol for clarity.

Figure 3A:
FIGS. 3A–3H are diagrams showing a method for manufacturing a carbon nanotube field emission display according to one embodiment of the invention.

As shown in FIG. 3A, a glass substrate 21 is provided.

Figure 3B:
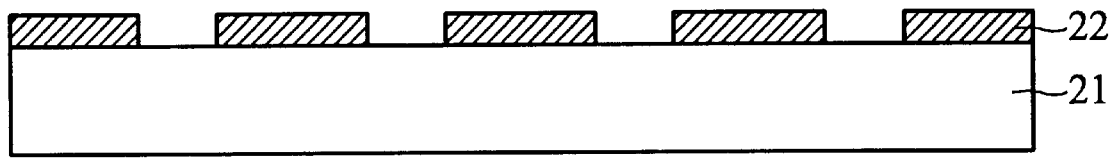

As shown in FIG. 3B, a conducing layer 22 with lines, such as Ag, is screen printed on the glass substrate 21 as a cold cathode. The conducting layer 22 is then sintered.

Figure 3C:
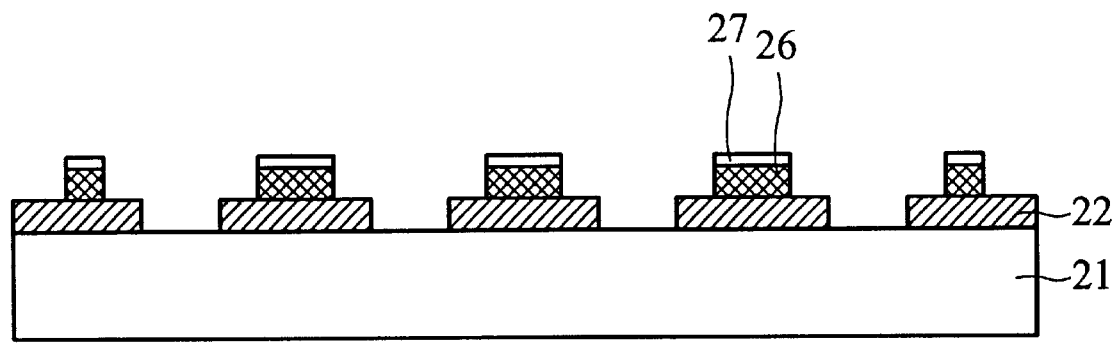

As shown in FIG. 3C, carbon nanotube layer 26 are formed on the conducting layer 22 for electron emission. A protection layer 27 is also formed on the carbon nanotube layer 26. The carbon nanotube layer 26 and protection layer 27 are then sintered. The protection layer 27 protects the carbon nanotube layer 26 from damages during sintering and sandblasting.

Figure 3D:
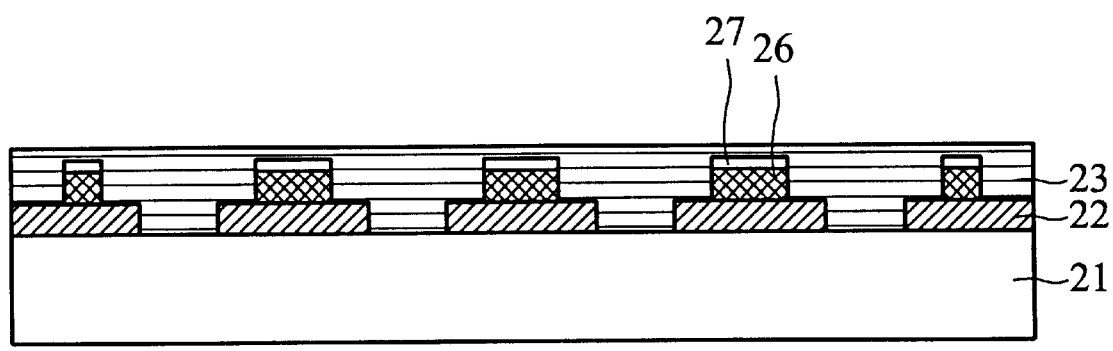

As shown in FIG. 3D, an isolation layer 23 is coated on the protection layer 27 and conducting layer 22 by screen printing.

Figure 3E:
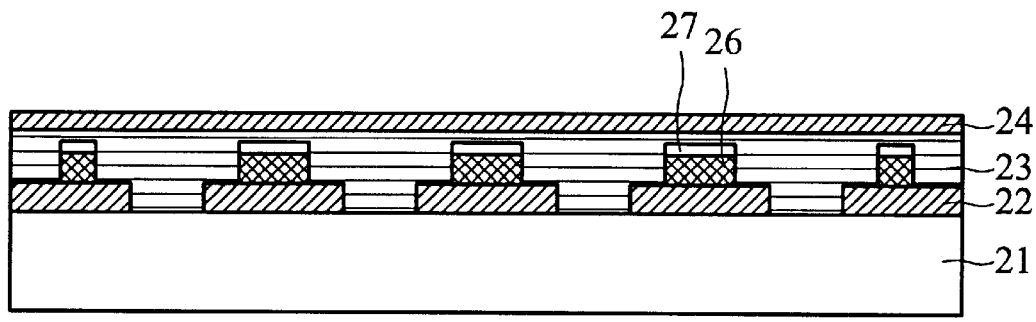

As shown in FIG. 3E, a conducting layer 24 with lines, such as Ag, is further screen printed on the isolation layer 23 as gates. The lines of the conducting layers 22 and 24 are perpendicular. The pattern of the halftone defines the gates.

Figure 3F:
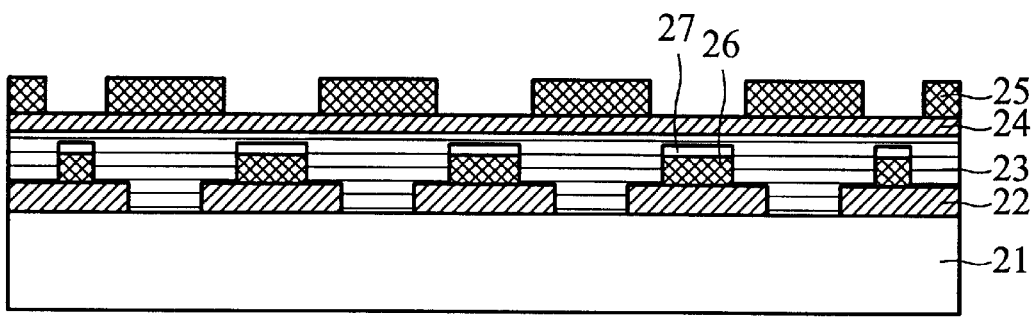
Figure 3G:
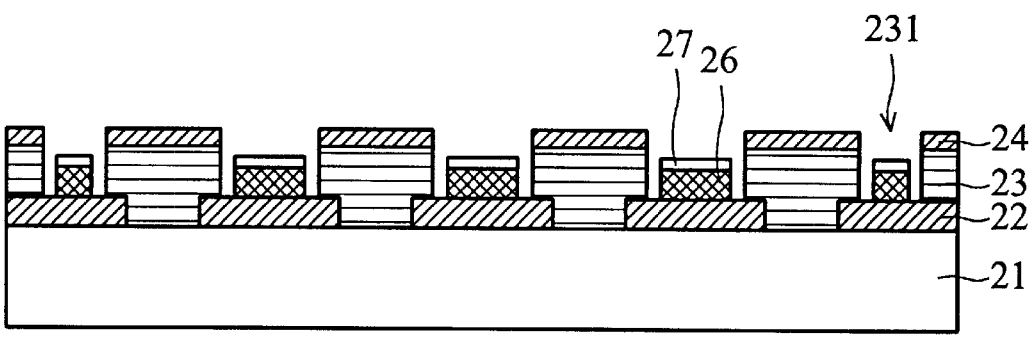

As shown in FIG. 3F, the conducting layer 24 is covered by a patterned masking layer 25. The part of the conducting layer 24 and isolation layer 23 not covered by the masking layer 25 is dry etched by sandblasting. The sintered conducting layer 22 and protection layer 27 are more resistive from being etched by sandblasting than the un-sintered conducting layer 24 and the isolation layer 23. The conducting layer 22 and the protection layer are stop layers for the sandblasting etching. Thus, the pattern on the masking layer 25 forms cavities 231 exposing the conducting layer 22, as shown in FIG. 3G.

Figure 3H:
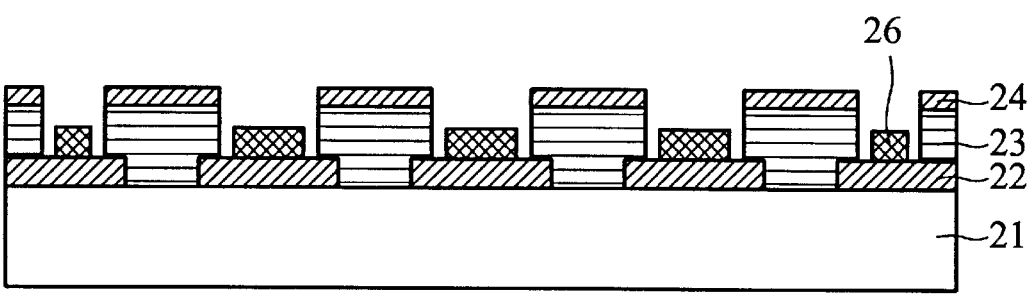

Finally, as shown IN FIG. 3H, the conducting layer 24 and the isolation layer 23 are sintered and the protection layer 27 is removed.

The sandblasting used in the invention is a popular step for manufacturing plasma displays, and reduces the cost of the inventive method. Further, the sharp edges formed by the inventive method eliminate the drawbacks of the gentle slopes formed in the conventional method. Thus, the inventive method is suitable for manufacturing a large area triode carbon nanotube field emission display.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for manufacturing a carbon nanotube field emission display comprising the steps of:

providing a substrate;

screen printing a first conducting layer on the substrate;

sintering the first conducting layer;

screen printing an isolation layer on the first conducting layer and a second conducting layer on the isolation layer;

etching the second conducting layer and the isolation layer, whereby a cavity exposing the first conducting layer is formed;

sintering the second conducting layer and the isolation layer; and forming a carbon nanotube layer on the first conducting layer in the cavity.

2. The method as claimed in claim 1 wherein the second conducting layer and the isolation layer are etched by sandblasting.

3. The method as claimed in claim 1 wherein the first and second conducting layer are Ag.

4. A method for manufacturing a carbon nanotube field emission display comprising the steps of:

providing a substrate;

screen printing a first conducting layer on the substrate;

sintering the first conducting layer;

forming a carbon nanotube layer on the first conducting layer and a protection layer on the carbon nanotube layer;

sintering the carbon nanotube and the protection layer;

screen printing an isolation layer on the first conducting layer and the protection layer, and a second conducting layer on the isolation layer;

etching the second conducting layer and the isolation layer, whereby a cavity exposing the protection layer and first conducting layer is formed; and sintering the second conducting layer and the isolation layer, and removing the protection layer.

5. The method as claimed in claim 4 wherein the second conducting layer and the isolation layer are etched by sandblasting.

6. The method as claimed in claim 4 wherein the first and second conducting layer are Ag layers.

7. The method as claimed in claim 5 wherein the protection layer protects the carbon nanotube layer from the sandblasting.

* * * * *